Dec. 2, 1969  J. M. WUNDERLEY  3,481,290
APPARATUS FOR THERMAL DECOMPOSITION OF MIXED CITY REFUSE
Filed June 26, 1968

INVENTOR.
JOHN M. WUNDERLEY.
By Parmelee, Utzler & Welsh
his Attorneys

United States Patent Office 3,481,290
Patented Dec. 2, 1969

3,481,290
APPARATUS FOR THERMAL DECOMPOSITION OF MIXED CITY REFUSE
John M. Wunderley, 900 Elizabeth Ave., McKeesport, Pa. 15133
Filed June 26, 1968, Ser. No. 740,192
Int. Cl. F23g 3/00; F23b 1/00
U.S. Cl. 110—8                 6 Claims

ABSTRACT OF THE DISCLOSURE

The invention is concerned with thermal decomposition of mixed municipal refuse as conventionally collected by a municipality or other agency and employs a high temperature flame, fueled by oxygen, directly contacting the refuse as received within an incinerator so as to reduce the combustible matter therein to a residual ash and to melt the noncombustible matter such as metal, glass, etc., and separately withdraw such residue from the incinerator. The operation is continuous and the refuse is fed to the incinerator at intervals to maintain a substantially uniform volume of refuse within the combustion chamber.

BACKGROUND OF THE INVENTION

Field of the invention

The field of the invention is furnaces as classified in Class 110.

Description of prior art

U.S. 1,160,360 is directed to disposal of mixed city refuse but this disclosure does not provide for direct charge of the refuse into the furnace.

U.S. Patent 3,344,758 is directed to thermal decomposition of waste products, the apparatus for accomplishing same refers to decomposition only about the inner periphery of same and not throughout the entire cross-sectional area of the apparatus.

Summary

The invention relates to thermal decomposition of municipal refuse within a refractory lined vertical shaft furnace by means of oxygen providing a flame temperature of about 3000° F. impinging upon the charge of municipal refuse therein. Said municipal refuse is continuously charged into the furnace through a laterally extending refractory lined enclosure which is kept substantially filled with said refuse material and the rate of feed is such as to maintain the charge of refuse within the furnace to about the level of the laterally extending refuse inlet enclosure. A bottom outlet in the shaft furnace provides for periodic discharge of molten noncombustible material and a suitable outlet at a higher level provides for discharge of the combusted material in the form of a molten ash which is collected and cooled into a brittle readily crushable material. A suitable hood overlying the top of the shaft furnace discharges the gaseous products of combustion to a suitable recipitator to remove solid therefrom.

One object of the invention is to provide means for continuous thermal treatment of municipal waste, to effect combustion of all combustible materials and melting of noncombustible materails, within a suitable combustion chamber, while periodically withdrawing the melted noncombustible material from the bottom of the combustion chamber and continuously withdrawing the residual ash of combustion from the chamber in vertically spaced relation to the bottom of the said combustion chamber.

Another object of the invention is to provide for feed of such refuse to the furnace and maintaining a reservoir of molten noncombustible material at the bottom of the furnace beneath the refuse to accelerate combustion of the refuse, which molten noncombustible materials are periodically discharged from the furnace.

Another object of the invention is to provide for intermittent feed of the refuse through a side wall of the furnace by means of a laterally extending inlet duct which is preferably maintained filled with the refuse from a suitable feed hopper and which is intermittently discharged into the furnace by a reciprocating pusher mechanism.

Figure 1:
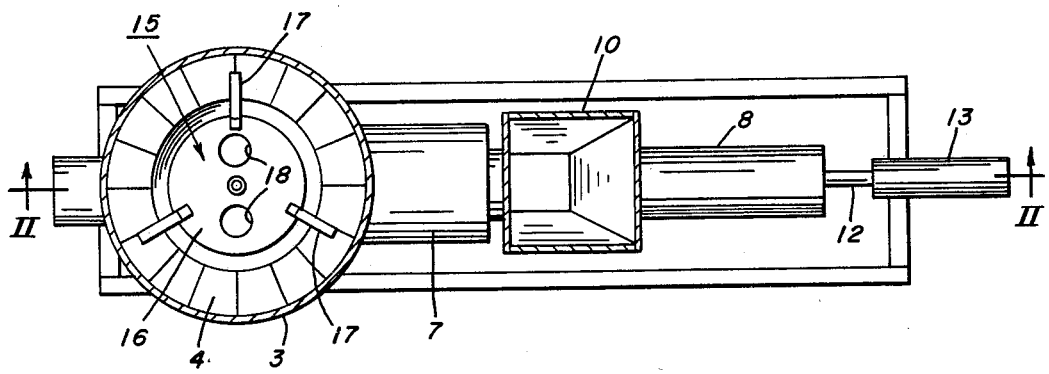
Figure 2:
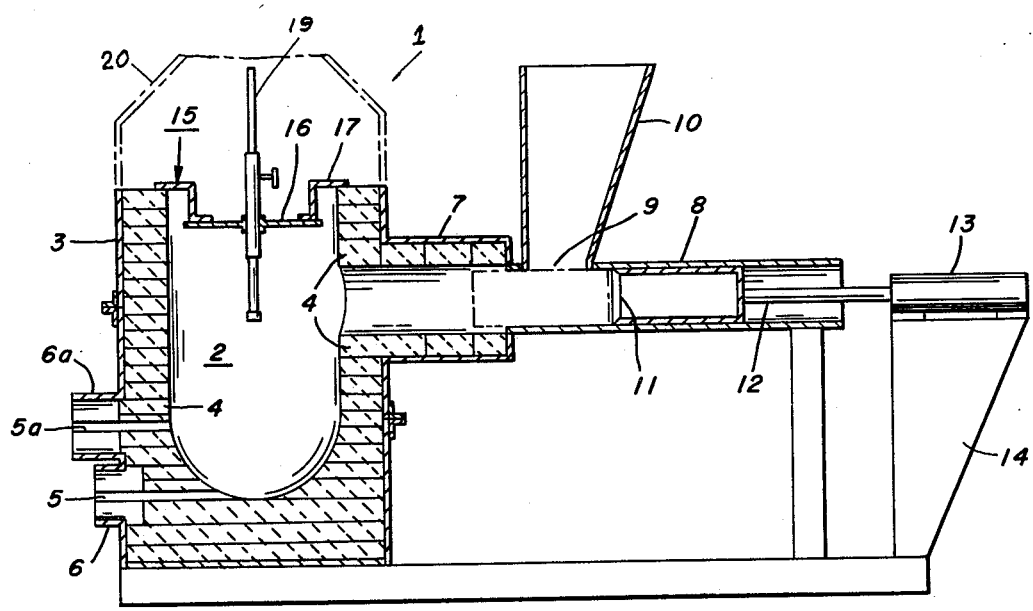

Referring now to the drawing, FIG. 1 shows a plan view of one form of the furnace of the invention and FIG. 2 shows a transverse section through the furnace as taken on lines II—II of FIG. 1.

Referring now in detail to the drawing, furnace 1 is comprised of a vertically disposed annular combustion chamber 2 defined by a suitable metal exterior 3 having a suitable inner refractory lining 4 to withstand temperatures in excess of 2000° F. The bottom portion of chamber 2 is preferably semicircular and is provided with a suitable outlet 5 extending through side wall 3 and 4, and defined by a suitable annular flange 6 to receive suitable refractory stopper material. In vertically spaced relation to outlet 5 is an outlet 5a defined by annular flange 6a for discharge of a molten ash of combustion which floats upon the top surface of the molten noncombustible material at the base of shaft 2. Adjacent the top of combustion chamber 2 is a suitable laterally extending refuse feed inlet 7 to the combustion chamber. This inlet 7 is also lined with suitable refractory material 4. Inlet 7 adjacent its outer end terminates in a suitable refuse feed tube 8. Adjacent the outer end of inlet 7 is a suitable opening 9 in feed tube 8 and a suitably sized refuse feed hopper 10 is connected therewith. The refuse feed tube 8 extends rearwardly from said hopper 10 and houses a refuse pusher head 11 which may be actuated by a suitable mechanism, such as a reciprocating piston 12 and suitable actuating cylinder 13 supported upon a suitable stand such as 14. It will be noted refuse pusher head 11 in retracted position, as shown by solid lines, permits refuse to move from hopper 10 into feed tube 8 and as pusher head 11 is advanced the refuse is pushed towards but not into combustion chamber 2. Thus the refuse feed inlet 7 is maintained filled with refuse and acts as a barrier to flow of heat and gases from combustion chamber 2 into inlet 7. Thus each successive advancement of piston 8 with its charge of refuse forces the previous refuse in tube 7 into combustion chamber 2.

Overlying the open top of combustion chamber 2, as shown in FIGS. 1 and 2, is suitable high temperature resistant cover plate assembly indicated generally as 15, comprised of a plate 16 and support members 17 engaging the refractory 4 to support plate 16 in spaced relation to the combustion chamber refractory 4. Overlying the top of combustion chamber 2 is shown a suitable hood 20, as indicated in dotted lines, which may be employed to convey combustion gases to a suitable precipitator (not shown) to remove solids from the combustion gases discharged to the atmosphere. As shown in FIG. 1, cover plate 16 may be provided with suitable openings therein provided with removable cover plates 18 for additional venting of combustion gases where required. Centrally of plate 16 is mounted a suitable oxygen lance 19 for combustion of the refuse in combustion chamber 2.

The average municipal refuse as collected today includes combustible material such as garbage, paper, bones, rags, scrap rubber, discarded wood, etc. It also includes metal, glass, plastic materials and manufacturing scrap and refuse which is not generally considered to be combustible but which can be melted within the furnace of the invention.

The refuse incinerator of the invention provides a means for drying and burning all combustible materials and melting of noncombustible materials to reduce the volume thereof. The means to support combustion is oxygen which may be injected into the incinerator from a suitable form of oxyben lance. Preferably, combustion air is not injected into the lance since the oxygen from the lance provides higher temperature flame than when mixed with air.

The size of the combustion chamber is generally dictated by the volume of refuse to be incinerated during a given period, and since refractory linings are available having a useful life of eight months to one year the incinerator may be operated for an entire 24 hour period each day. Incineration has been found to be accelerated by maintaining a molten bath of molten glass metal and other noncombustible material at the bottom of the combustion chamber, the temperature thereof, which is about 2000° F. or more, aids in the drying and combusting of the combustible material above the molten metal and glass. The temperatures within the combustion chamber and above the molten metal has been found to be 1000° F. and above.

After the filled combustion chamber is initially ignited and the oxygen issues from the lance, the herein method of charging the incinerator with refuse makes possible predrying of the forward face of the refuse before entering said chamber. Upon reference to FIG. 2 of the drawing, it will be noted that refuse entering the tube 8 from hopper 10 is advanced towards the combustion chamber by means of the pusher head 11, but such head does not have sufficient travel to advance the refuse into the combustion chamber 2. However, after one or more reciprocating movements of pusher head the entire length of inlet 7 is filled and thereafter each successive movement of pusher head 11 forces a portion of the refuse within inlet 7 into the combustion chamber 2. Thus, the refuse being discharged into chamber 2 is predried by exposure to the combustion chamber temperature of 1000° F. or more.

The rate of feed of refuse to the combustion chamber is preferable such as to maintain a substantially uniform volume of refuse within the furnace, successive layers of which are in various stages of reduction. The maintenance of a pool of melted noncombustible material at the base of chamber 2 supplies additional heat for treatment of the refuse thereabove and within the chamber 2.

The residual combustion products discharged from the furnace through outlet 5a, resulting from the heterogeneous nature of the refuse treated, is in the form of a heavy flowable mixture which upon cooling after discharge provides a solid brittle substantially odorless mass which may be readily crushed into granular form and may be used as fill for any open or underground cavities, or other purposes. The residual noncombustible products may comprise melted metals, glass and other nonflammable materials.

I claim:

1. A process for incineration of mixed city refuse comprised in part of combustible and in part of noncombustible material to form a fused brittle mass of the residual combustible material and a separate melted mass of the noncombustible materials, comprising:
   (a) intermittenly feeding such refuse into a combustion chamber to maintain a substantially uniform volume therein,
   (b) igniting and continuously contacting the accumulating burning refuse within said chamber with a stream of oxygen for burning and melting the accumulation refuse,
   (c) collecting the melted noncombustible material within the bottom of the combustion chamber to maintain a pool thereof and intermittently discharging a portion of same from the chamber, and
   (d) continuously withdrawing the residual ash from the combustible material within the combustion chamber in an area above the underlying molten noncombustible material.

2. The process as defined in claim 1, wherein the intermittent feed of refuse into the combustion chamber is through a side wall thereof and adjacent the level of the body of the combusting material therein.

3. Apparatus for thermal disposal of mixed city refuse including combustible and noncombustible materials, comprising:
   (a) means defining a vertically disposed open top combustion chamber having a suitable refractory lining therein,
   (b) means defining an exterior refuse feed chamber extending laterally through a wall of said combustion chamber in spaced relation to the open top thereof for feeding said refuse to said chamber,
   (c) means on a vertical wall of said combustion chamber for selectively withdrawing the residual ash of combustible material and the melted noncombustible material from said combustion chamber at different vertically spaced levels, and
   (d) means overlying said combustion chamber for venting combustion gases therefrom and for supporting an oxygen lance for thermal treatment of materials within said combustion chamber.

4. Apparatus as defined in claim 3 wherein said means defining a vertically disposed combustion chamber comprises: a hollow preferably metal shell of suitable capacity, a suitable refractory lining forming the inner and bottom faces of said shell to withstand the temperatures of combustion of said refuse and the temperatures of residual ash and molten unburned noncombustible refuse materials.

5. Apparatus as defined in claim 3, wherein the means defining a refuse feed chamber extending laterally through a wall of said combustion chamber comprises a refractory lined hollow member piercing the wall of the refractory lined combustion chamber adjacent the top thereof, a rearwardly extending hollow refuse receiving member communicating with said first named member, a feed hopper for receiving the said collected refuse and feeding same into said rearwardly extending member, a reciprocating refuse pusher head mounted in said rearwardly extending member for alternately uncovering the mouth of said feed hopper to admit refuse into said hollow refuse receiving member and for advancing the refuse through the said refuse feed chamber for discharge into said combustion chamber.

6. Apparatus for disposal of mixed city refuse comprised of combustible and noncombustible material by means of thermal decomposition comprising:
   (a) a vertically disposed refractory lined open-top refuse receiving and heating chamber,
   (b) means overlying said chamber for venting combustion gases therefrom and for vertically adjustably supporting an oxygen feeding means for combusting and melting the mixed refuse received within said chamber,
   (c) an opening through a side wall of said chamber adjacent the top thereof for the reception of said mixed refuse into said chamber,
   (d) means exterior of said chamber connected with said chamber side wall opening for feeding said mixed refuse at a controlled rate into said combustion chamber, and
   (e) means within said chamber adjacent the bottom thereof for separately discharging therefrom the residual ash from the combustible material and the melted noncombustible material at different vertical levels.

References Cited
UNITED STATES PATENTS

| | | | |
|---|---|---|---|
| 1,160,360 | 11/1915 | Atterbury et al. | 110—8 |
| 2,537,467 | 1/1951 | Komline | 110—8 |
| 3,027,854 | 4/1962 | Akerlund | 110—15 |
| 3,344,758 | 10/1967 | Wotschke | 110—18 |
| 3,358,625 | 12/1967 | Jones | 110—8 XR |

KENNETH W. SPRAGUE, Primary Examiner

U.S. Cl. X.R.

110—18, 85